United States Patent [19]

Cuff et al.

[11] 4,158,537

[45] Jun. 19, 1979

[54] SELECTIVE LOADING OF PLASTIC MOLDING COMPRESSION MOLDS

[75] Inventors: Frederick L. Cuff, Woodbridge; Walter J. Walek, South Windsor, both of Conn.

[73] Assignee: United Technologies Corporation, Hartford, Conn.

[21] Appl. No.: 859,882

[22] Filed: Dec. 12, 1977

[51] Int. Cl.² .............................................. B28B 13/02
[52] U.S. Cl. ................................... 425/260; 264/109; 222/564; 222/145
[58] Field of Search ........................ 425/260; 264/109; 222/136, 145, 564

[56] References Cited

U.S. PATENT DOCUMENTS

| 767,872 | 8/1904 | Davies | 425/260 |
|---|---|---|---|
| 807,484 | 12/1905 | Moss | 222/145 |
| 1,652,884 | 12/1927 | Ackermann | 425/260 |
| 1,746,766 | 2/1930 | Crandall | 222/145 |
| 2,859,502 | 11/1958 | Brown, Jr. | 425/260 X |
| 2,948,438 | 8/1960 | Lippert | 222/145 |
| 3,863,811 | 2/1975 | Fisher et al. | 222/145 |
| 3,955,907 | 5/1976 | Yamasita et al. | 425/260 X |
| 4,036,575 | 7/1977 | Prince | 425/260 X |
| 4,050,865 | 9/1977 | Drostholm et al. | 425/260 X |

FOREIGN PATENT DOCUMENTS 1435358  5/1976  United Kingdom ................... 425/260

*Primary Examiner*—Robert L. Spicer, Jr.
*Attorney, Agent, or Firm*—Charles A. Warren

[57] ABSTRACT

A shuttle having the same shape as a mold cavity has a slidably removable bottom so that material distributed in the shuttle may be dropped into the mold by removing the slidable bottom with a series of baffles positioned in the mold serving to hold the material in the shuttle in position so it will not be moved out of position as the slidable bottom is removed.

6 Claims, 3 Drawing Figures

4,158,537

SELECTIVE LOADING OF PLASTIC MOLDING COMPRESSION MOLDS

BACKGROUND OF THE INVENTION

In positioning thermosetting and thermoplastic material into a mold for compression molding, this material must generally be preferentially distributed in the mold to assure complete filling of the mold since some of the materials being molded do not flow readily enough to fill the outer portions of the mold cavity adequately. Further, some thermosetting materials begin to harden in the mold before they are adequately distributed making uniform distribution impossible.

Although preformed pellets have been used, this requires a preliminary molding operation that is time consuming and expensive and may affect the ultimate setting qualities of the material. When attempts have been made to distribute the material manually within the hot mold cavity for better uniformity in the finished article such distribution is difficult because of the mold temperature, for example 400° F., and the effect of this heat on the worker. With complex molds the time required is such that curing of the thermosetting resin may begin before the material has been properly distributed.

SUMMARY OF THE INVENTION

These objections are overcome by using a shuttle that is shaped to conform to the mold and has a slidably removable bottom or floor. When the material to be molded is distributed in the shuttle to suit the contours of the mold, a grid or baffles provided in the shuttle support the material in such a way that the material will stay in place laterally in the shuttle when the removable bottom is slid out. When the loaded shuttle is placed directly over the mold cavity and the slidable bottom is removed, the moldable material is dropped into the mold cavity being properly distributed therein by the grid or baffles and assuring complete filling of the entire mold area. The shuttle and the process of using it are both considered to be parts of this invention.

The foregoing and other objects, features, and advantages of the present invention will become more apparent in the light of the following detailed description of preferred embodiments thereof as illustrated in the accompanying drawing.

DESCRIPTION OF THE PREFERRED EMBODIMENT

Figure 1:
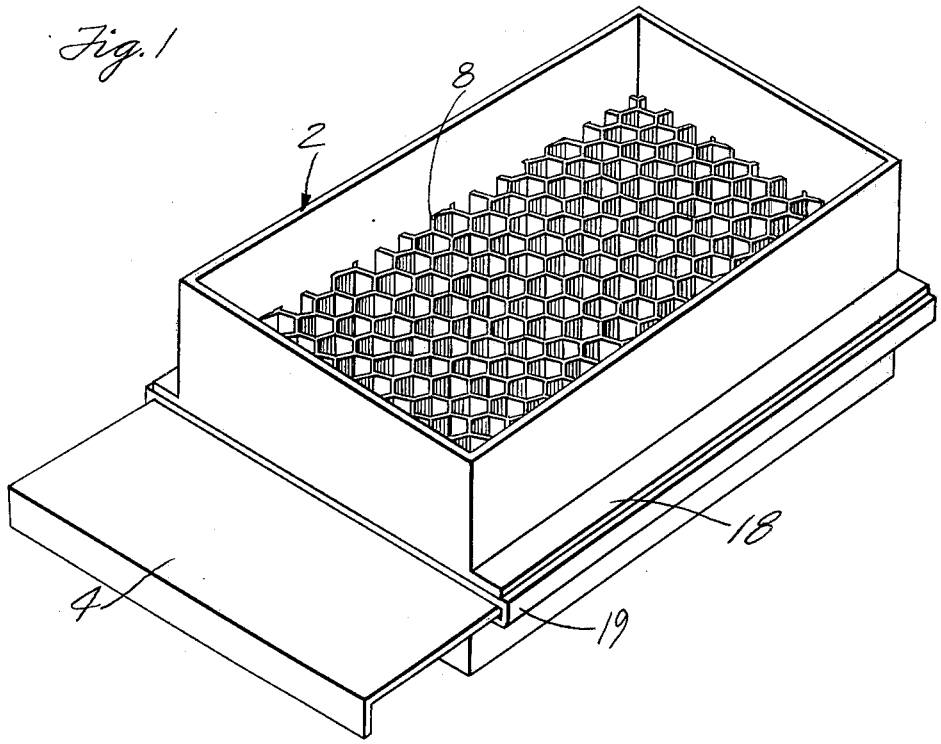
FIG. 1 is a perspective view of the shuttle of the invention.

In order to have the desired distribution of the thermoplastic or thermosetting material in the mold in which it is to be molded, a box or shuttle 2 is provided in the shape of the mold cavity. For the purpose of this description, it is assumed that the mold cavity is rectangular and thus the box shown is also rectangular and the same dimension as the mold cavity. In any event, the open area of the box that receives the molding material corresponds to the shape of the mold cavity. The box 2 has a slidable bottom 4 guided in grooves 6 in opposite walls of the box and this bottom when withdrawn exposes the open area of the box. The purpose is to distribute the molding material, which is granular or powdered or the like, in the box to the proper depth to assure all parts of the mold cavity being filled to the desired amount. This filling of the box or shuttle will preferably be done at a bench or other location away from the hot molds for convenience. In filling the box, the depth of the material therein will be adjusted to compensate for the change in dimension when the material is compressed in the mold. If the mold cavity varies in depth, the molding material would also be distributed in the box in depths varying in the same manner as the depths of the mold.

In accordance with this invention, to hold the material in precise vertical position over the entire mold so that it will drop into the proper location in the mold cavity, a grid 8 is positioned in the molding material in the box before the bottom is withdrawn from the box. This grid desirably fits closely in the box and rests on the bottom of the box. The grid may be free of the box and is placed therein after the molding material is leveled in the box, the grid (preferably honeycomb, as shown) being slightly larger than the box area so as to be compressed a little in placing it in the box. In this way it engages and is held by the sides of the box just above and preferably in contact with the bottom. The contact with the sides of the box is such that it stays in position when the bottom is withdrawn.

This grid is desirably relatively fine and will hold the molding material in position laterally so it is not displaced during sliding of the bottom and will drop precisely where desired in the mold cavity. Obviously, the smaller the openings in the grid the more precisely the material will be held in position and therefore more uniformly distributed. If the grid is loose in the box, the ledge 10 provided in the box prevents the grid from dropping out when the bottom is withdrawn.

Figure 2:
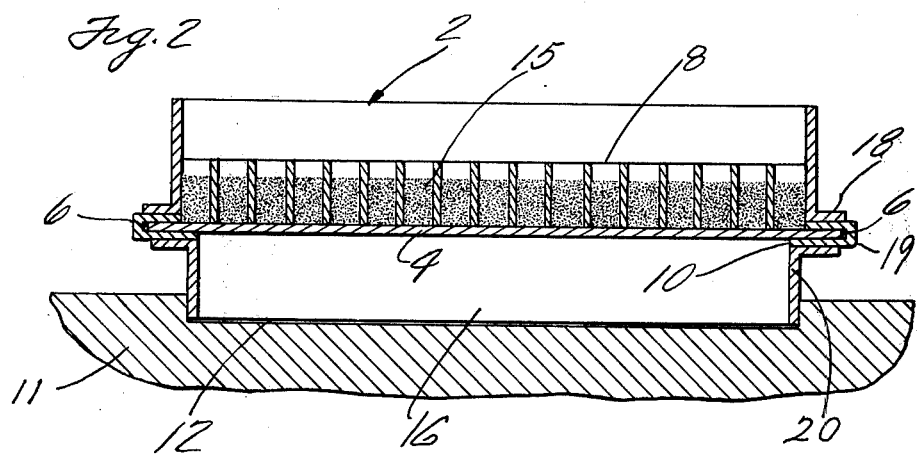
FIG. 2 is a vertical sectional view through the shuttle resting on a mold.

When it is time to fill the mold or to refill it in a repeated molding process, the box or shuttle with the molding material and the grid therein is carried to the mold 11, FIG. 2, placed directly over the cavity 12 as shown in this figure and the bottom 4 is then slid out of the box to allow the pulverulent material 15 therein to drop into the mold cavity. Preferably the lower edge portion 16 of the box fits within the cavity as shown to hold the box in position. This arrangement works well when the material is compacted enough in the box so as to slide from the bottom without being laterally displaced with respect to the grid by the movement of the bottom.

A preferred construction for the box is the sheet metal construction shown, in which the box itself is made of sheet metal 18 in L-shape, the base of the L being turned outwardly as shown. The groove for the box bottom is formed by a U-shaped metal element 19 brazed or welded to the base of the L with the U facing inward to receive the edges of the sliding bottom. On the underside of the U-shaped element is another L-shaped element 20 brazed or welded to the U and having a depending leg forming the lower edge portion 16 that fits within the mold cavity. The lower leg of the U-shaped element 19 extends inwardly beyond the wall defined by the element 18 and this leg forms the ledge 10 to support the honeycomb from dropping into the mold if it is not tight enough in the box. This makes a relatively simple construction that will have the required rigidity with relatively light weight.

Figure 3:
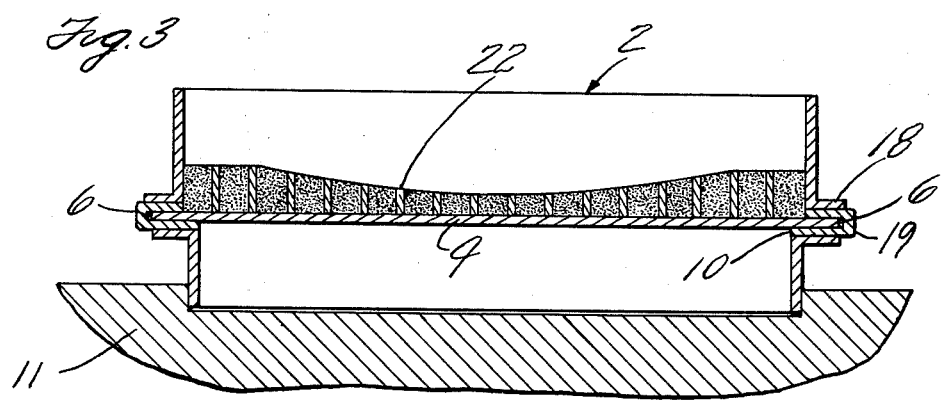
FIG. 3 is a vertical sectional view similar to FIG. 2 of a modification.

As shown in FIG. 3, the grid may be, instead of the uniform height of FIG. 2, a honeycomb grid 22 of varying height set into the box 2. In this event, the height of the honeycomb may be the depth to which the molding material should be packed in readiness for dropping into the mold. With this arrangement, the box is filled to the height of the honeycomb and is then used to fill the mold in the manner above described. Where the depth of the mold cavity varies, the height of the honeycomb may be adjusted accordingly as shown to assure proper depth in all areas of the shuttle to correspond to depths of the mold cavity.

Although the invention has been shown and described with respect to a preferred embodiment thereof, it should be understood by those skilled in the art that other various changes and omission in the form and detail thereof may be made therein without departing from the spirit and the scope of the invention.

Having thus described a typical embodiment of our invention, that which we claim as new and desire to secure by Letters Patent of the United States is:

1. A shuttle for loading a mold cavity in a mold in readiness for molding the material loaded therein, the shuttle including:

a box having an open area corresponding in shape to the mold cavity and a flange on the lower edge to engage in the cavity and locate the box thereon;

a slidable bottom on said box adapted, when removed, to uncover the open area of the box; and a grid in said box directly above the slidable bottom and immersed at least in part in the material in a position to hold the molding material in position laterally when the bottom is removed, said grid engaging the side walls of the box to position it thereon.

2. A shuttle as in claim 1 in which the grid is removable.

3. A shuttle as in claim 1 in which the grid is fixed in position.

4. A shuttle as in claim 1 in which the grid is a thickness comparable to the desired thickness of the molding material for filling the mold cavity.

5. A shuttle as in claim 2 in which the box has a ledge therein to support the grid when the bottom is withdrawn.

6. A shuttle as in claim 1 in which the grid is a honeycomb material with the openings therein vertically in the box.

* * * * *